(12) United States Patent
Couturier et al.

(10) Patent No.: US 8,496,813 B2
(45) Date of Patent: Jul. 30, 2013

(54) SOLAR POWERED SKIMMER FOR A SWIMMING POOL

(75) Inventors: Alain Couturier, Oshawa (CA); Robert Bryant, Oshawa (CA)

(73) Assignee: Douglas Bryant, Oshawa, Ontario (CA)

( * ) Notice: Subject to any disclaimer, the term of this patent is extended or adjusted under 35 U.S.C. 154(b) by 503 days.

(21) Appl. No.: 12/659,371

(22) Filed: Mar. 5, 2010

(65) Prior Publication Data

US 2011/0215038 A1 Sep. 8, 2011

(51) Int. Cl.
*E04H 4/16* (2006.01)
*B01D 33/056* (2006.01)

(52) U.S. Cl.
USPC ...................... 210/167.19; 210/400

(58) Field of Classification Search
USPC ............................. 210/167.19, 391, 396, 400
See application file for complete search history.

(56) References Cited

U.S. PATENT DOCUMENTS

| 3,367,080 | A |   | 2/1968 | Markel |
| 4,261,827 | A |   | 4/1981 | Bronnec |
| 4,485,013 | A | * | 11/1984 | Cockman ................... 210/242.2 |
| 6,029,290 | A |   | 2/2000 | Butcher et al. |
| 7,118,678 | B2 | * | 10/2006 | Porat ......................... 210/748.19 |
| 7,402,242 | B2 | * | 7/2008 | Duckett ................... 210/167.12 |
| 7,661,642 | B2 |   | 2/2010 | Oh et al. |
| 2006/0060513 | A1 |   | 3/2006 | Craig |
| 2007/0235380 | A1 |   | 10/2007 | Cawein |
| 2011/0186529 | A1 | * | 8/2011 | Wright .......................... 210/808 |

* cited by examiner

*Primary Examiner* — Fred Prince

(57) ABSTRACT

The skimmer has a conveyor belt which travels in ascending and descending paths. The lower portion of the belt is adapted to be immersed in the water in a swimming pool for skimming debris floating on the surface of the water. The debris is carried upward by the belt and separates from the belt at its upper end. Any debris which does not separate from the belt is removed by a brush which contacts the belt as it travels in the descending path. The belt has perforations through which water passes. One or more solar panels activate, in hole or in part, the operation of the conveyor belt. The solar panels can be aimed at the sum whether it is high or low in the sky and once aimed, move at a rate which equals the observed rate of movement of the sun as it crosses the sky from morning to evening such that the solar panels continuously face the sun during daylight.

13 Claims, 9 Drawing Sheets

SOLAR POWERED SKIMMER FOR A SWIMMING POOL

FIELD OF THE INVENTION

This invention relates to skimmers for swimming pools and more particularly to a skimmer which functions to remove debris from a swimming pool and which is activated, at least in part, by one or more solar panels.

BACKGROUND OF THE INVENTION

Water in a swimming pool is conventionally kept in circulation by a pump which causes a steam of the water to discharge continuously from the pool. From the pool, the discharged water flows to the pump and then returns to the pool. While the water is flowing to and from the pool it is filtered and disinfected.

Debris which floats on the surface of water is conventionally skimmed and collected in a perforated basket which is mounted in the stream of water which discharges from the pool. The basket is emptied manually and as a result, is not emptied continuously but only periodically.

The debris which floats in a pool commonly originates from vegetation in the vicinity of a pool. Leaves, needles from evergreens and twigs usually constitute the bulk of the floating debris. When such debris is allowed to accumulate in a perforated basket, it can inhibit the flow of water which circulates in a pool. At its worst, such debris can clog the basket entirely and cause a pump to overheat and eventually to break down.

We have invented a skimmer which removes floating debris continuously from a swimming pool. The skimmer is mounted in the stream of water which discharges from a pool and removes the debris as soon as it contacts the skimmer. As a result, floating debris is removed before it can interfere with the flow of the water. The skimmer is activated, in whole or in part, by one or more solar panels which face the sun and which move at a rate which equals the observed rate of movement of the sun as it crosses the sky from morning to evening. As a result, the solar panels continuously face the sun during daylight and receive maximum energy from the sun's rays.

The skimmer not only removes debris but provides an escape route for small animals that fall into a pool. Rabbits, squirrels, chipmunks, mice and voles normally drown in a pool and sink to the bottom. Occasionally however their bodies float on the surface and are drawn out of a pool by the water which discharges from it. A conventional skimmer can be clogged by their bodies whereas our skimmer removes their bodies without clogging. Should the animals be alive when they reach our skimmer, they can climb onto the skimmer and be carried out of the water without injury.

SUMMARY OF THE INVENTION

Briefly the skimmer of our invention includes: a solar panel pivotal about an axis and a flexible endless belt having lower and upper portions which terminate at lower and upper ends, respectively, of the belt. The skimmer includes motive means which cause the belt to travel in ascending and descending paths and which are activate, at least in part, by the solar panel. A lower portion of the belt is adapted to be immersed in the water in the swimming pool for skimming debris floating on the surface of the water. The skimmer includes swivelling means arranged to permit adjustment of the orientation of the axis such that the axis extends from east to west. Tilting means is provided for adjusting the position of the solar panel such that it faces the sun. The skimmer also includes means for causing the solar panel to pivot about the axis at a rate which equals the observed rate of movement of the sun as it crosses the sky from morning to evening such that the solar panel continuously faces the sun during daylight.

The solar powered skimmer of our invention is described in described in detail with reference to the accompanying drawings in which:

DESCRIPTION OF THE DRAWINGS

Like reference characters refer to like parts throughout the description of the drawings.

Description of Preferred Embodiment

Figure 1:
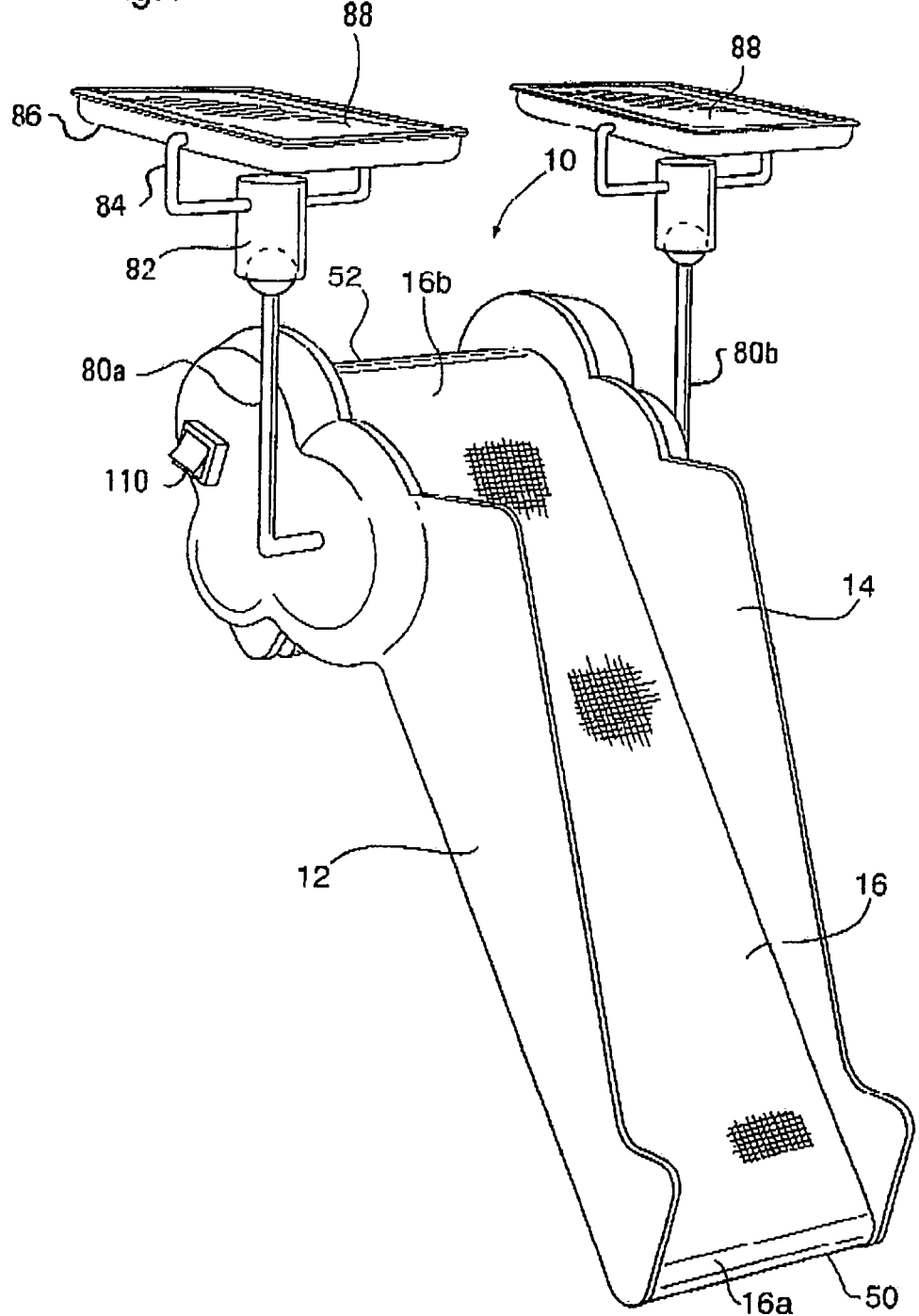
FIG. 1 is a perspective view of the skimmer and a pair of solar panels.
Figure 4:
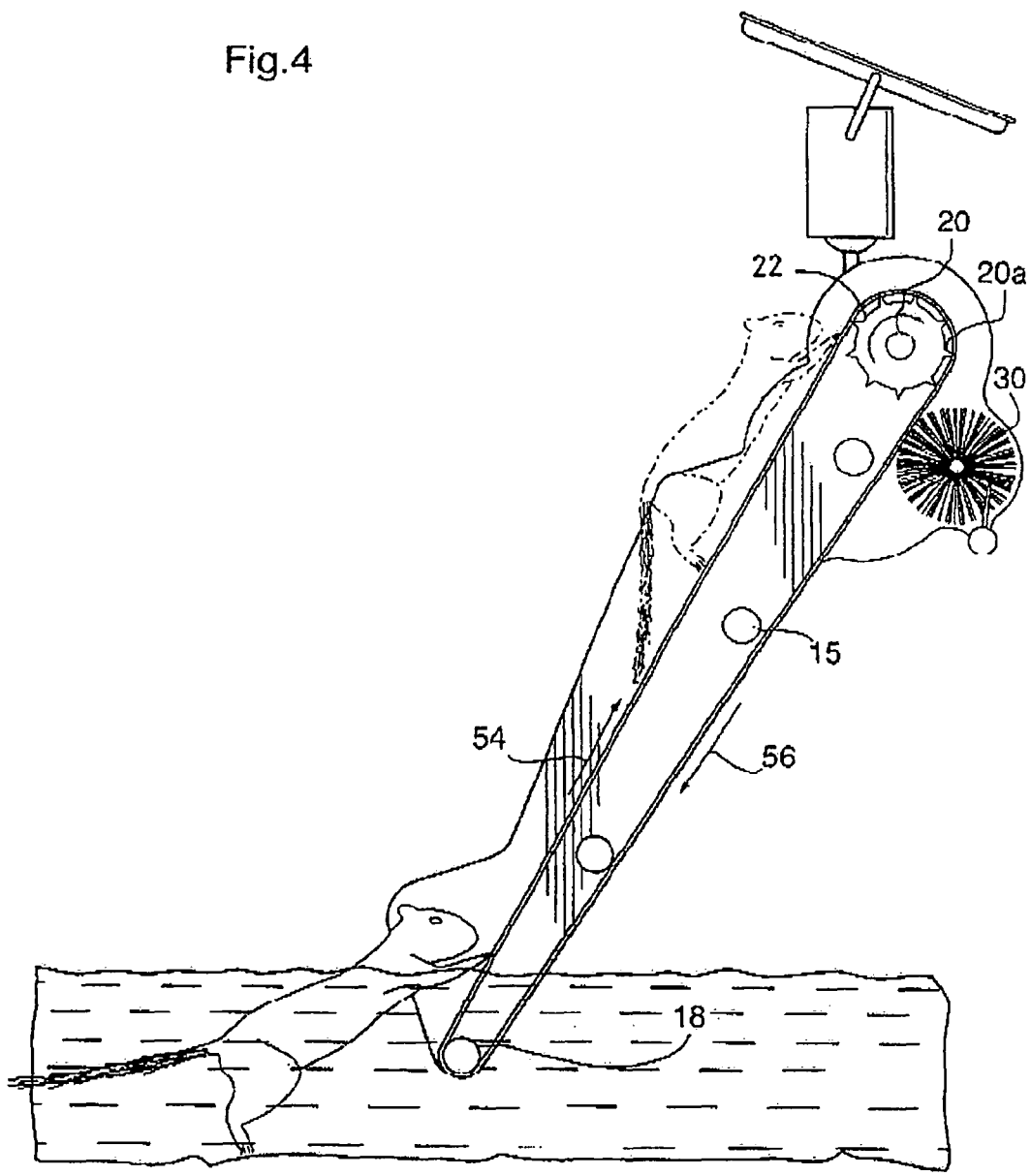
Figure 5:
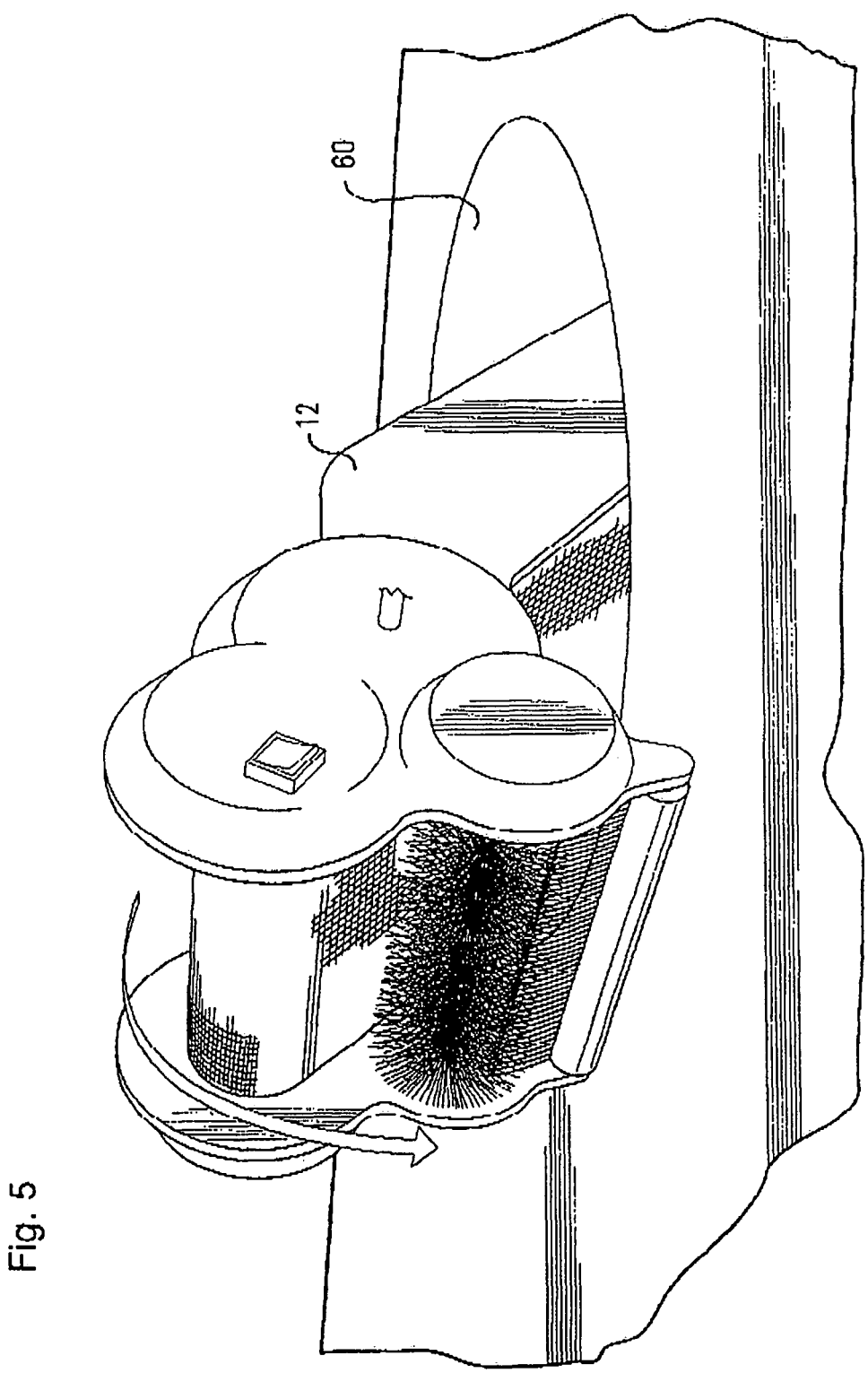
FIG. 5 is a perspective view of the upper portion of the skimmer in the absence of solar panels.

With reference to FIGS. 1, 4 and 5, the skimmer, generally 10, is composed of a frame which includes a pair of side walls 12, 14. The side walls are held apart by two or more steel rods 15. Between the side walls is a conveyor belt 16 which rotates about a lower spindle 18 and an upper spindle 20. Both spindles are mounted in bearings in side walls 12,14 and rotate about parallel axes. The upper spindle has radially outwardly extending teeth 20*a* which mesh with the openings or perforations in belt 16. The belt is composed of a screen, wire mesh or other material having such openings or perforations. Not only do the openings or perforations serve to engage the teeth of gear wheel 22 but also allow water to pass through the belt.

Figure 3:
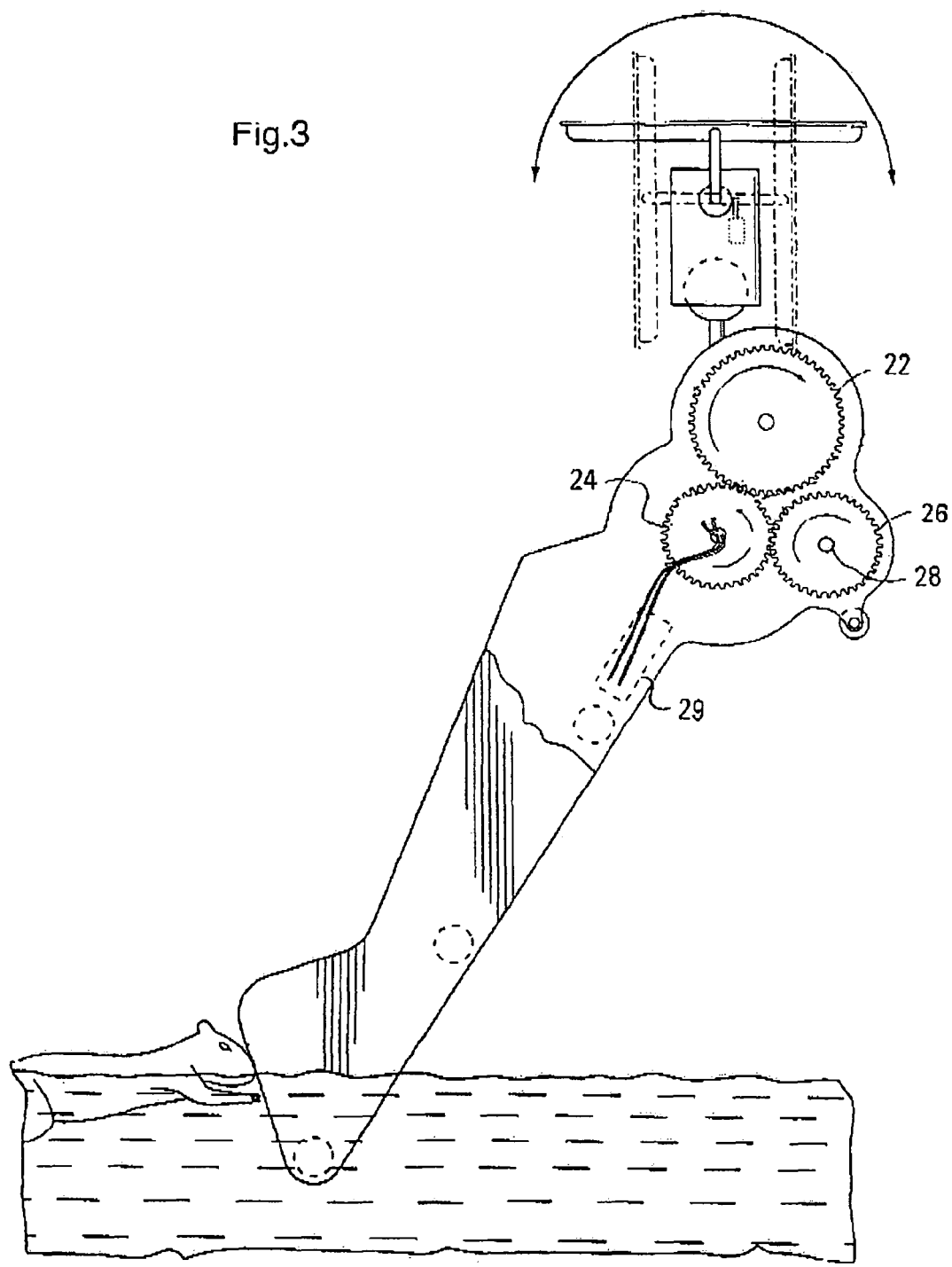
FIGS. 3 and 4 are elevations of the skimmer and solar panel from the side opposite that illustrated in FIG. 2.

With reference to FIG. 3, a gear wheel 22 is attached to one end of the upper spindle. The teeth of the gear wheel mesh with a drive gear 24. The teeth of the drive gear also mesh with a second driven gear wheel 26 which is mounted to a spindle 28. Drive gear 24 is driven by motive means in the form of an electric motor 29.

With reference to FIGS. 3, 4 and 5, spindle 28 is mounted in bearings in the side walls and extends parallel to the upper and lower spindles. A cylindrical brush 30 has a core within which spindle 28 is received. The core and spindle are interconnected so that the core and the remainder of the brush are rotated by the spindle. As illustrated, the brush is composed of bristles which radiate outwardly from its core.

With reference to FIGS. 1 and 4, belt 16 is endless and has lower and upper portions, generally 16*a,b* which terminate at lower and upper ends 50, 52, respectively. The belt travels in ascending and descending paths, generally 54, 56. In the ascending path, the belt begins its run at the lower spindle 18, runs upward and terminates its run at the upper spindle 20. The belt continues its run around the upper spindle 20 and begins its descent along the descending path. When the belt reaches the lower spindle 18 it travels around it and begins its ascent again along the ascending path.

As illustrated in the drawings, the direction of travel of the belt is normal to the axes of rotation of the three spindles 18, 20 and 22 of the skimmer.

Figure 2:
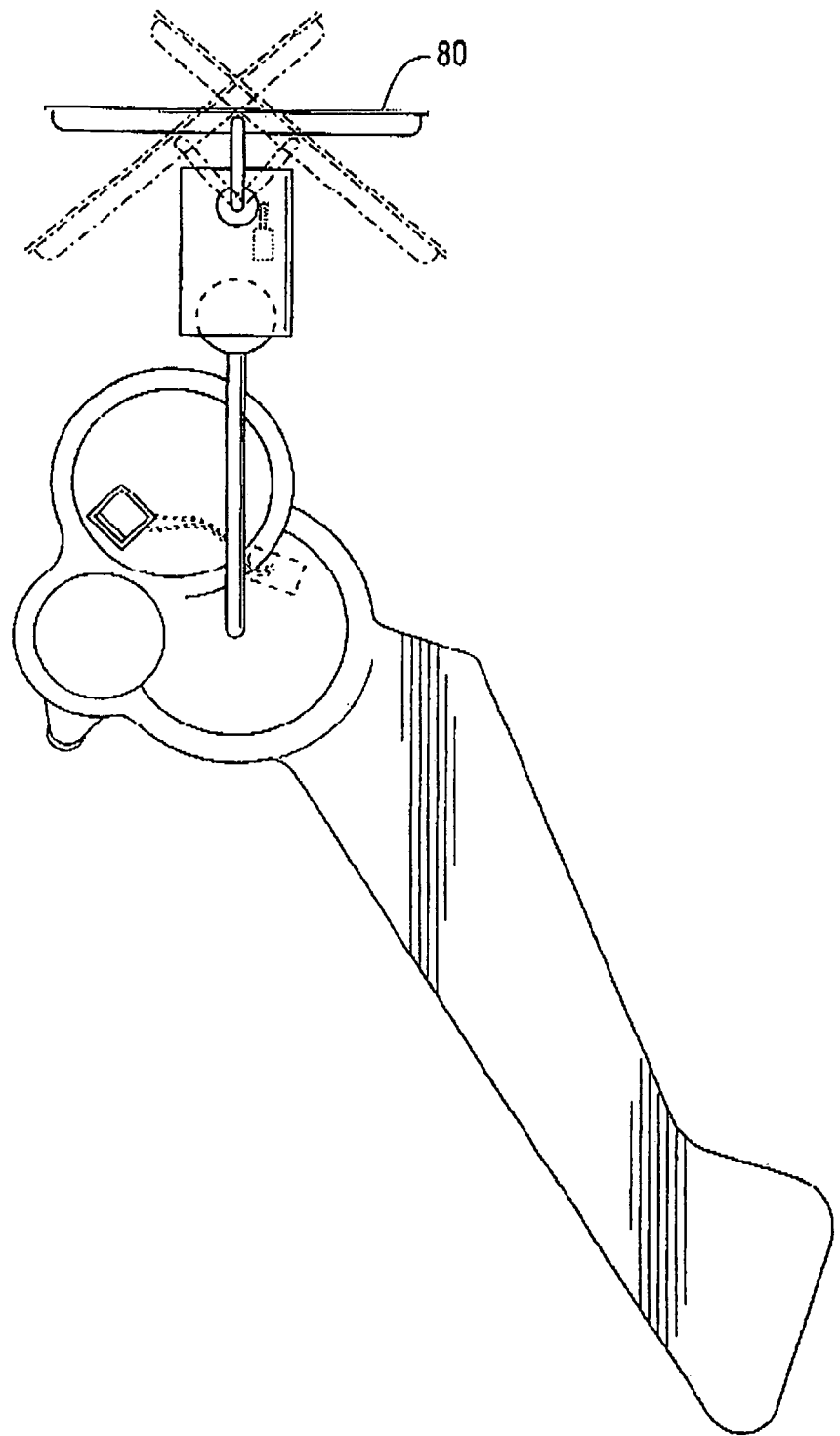
FIG. 2 is an elevation of the skimmer and one solar panel.
Figure 6:
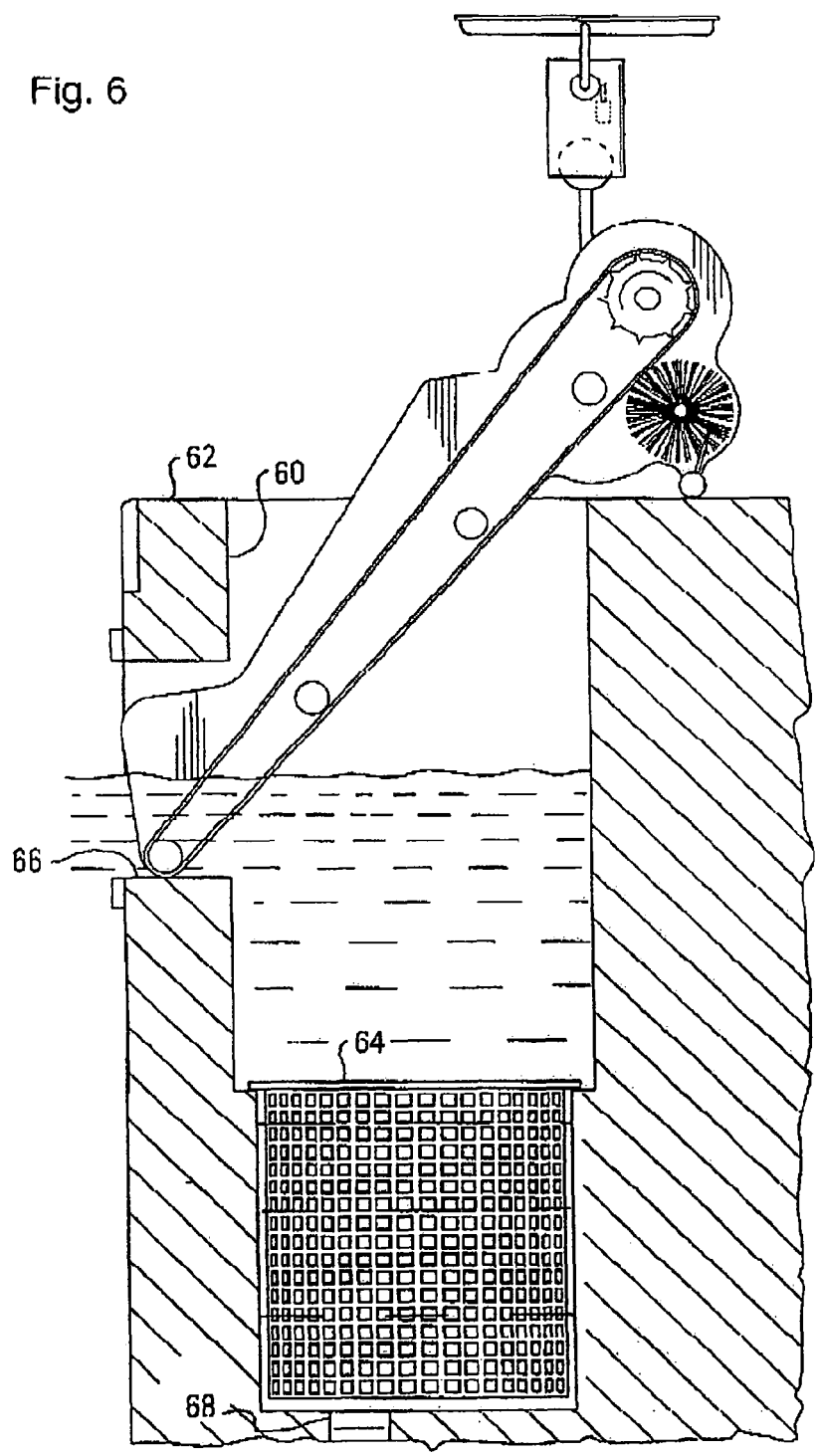
FIG. 6 is an elevation of the skimmer mounted for use in the opening in the pool deck in which a perforated basket is accommodated.
Figure 7:
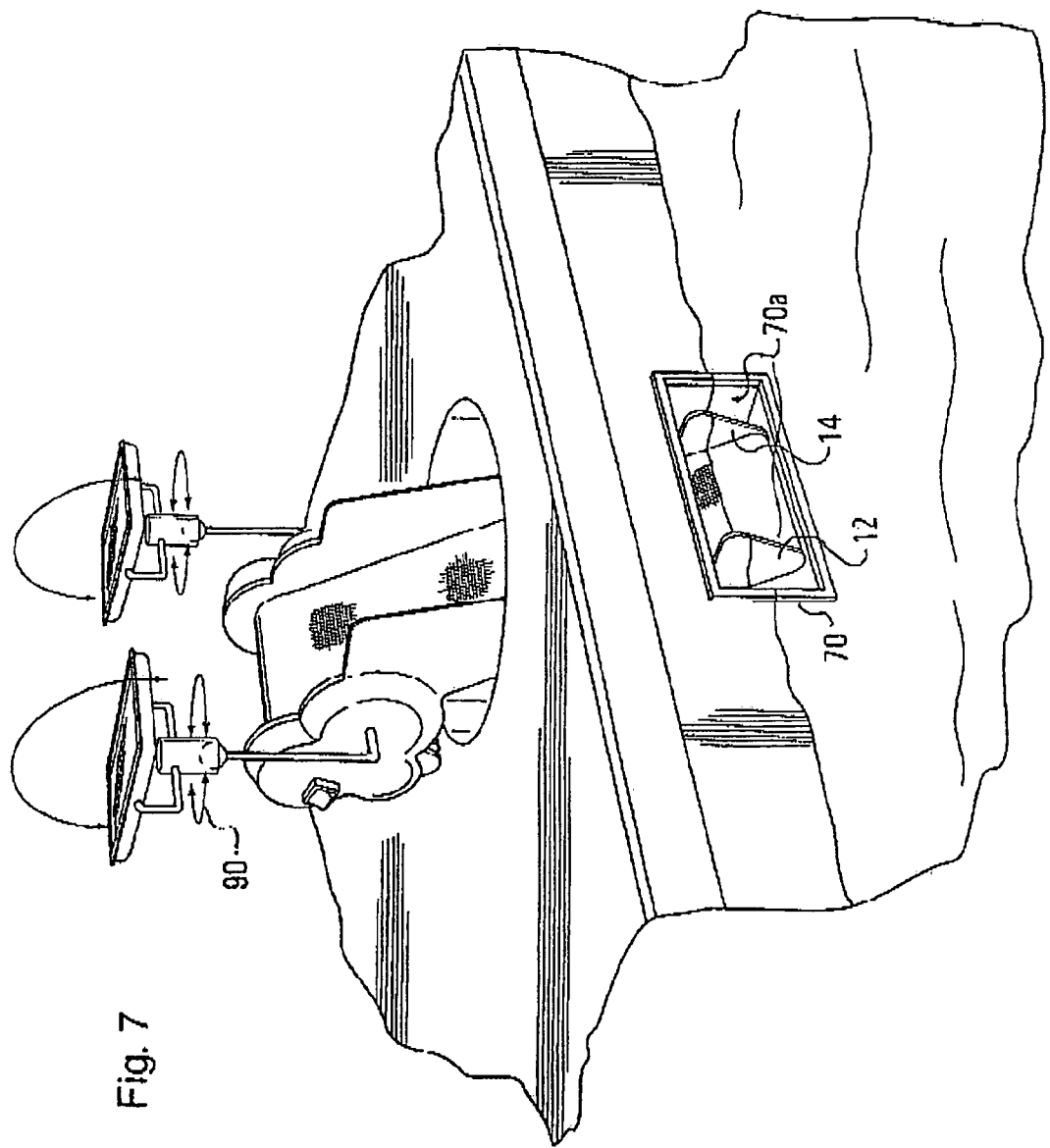
FIG. 7 is a perspective view of the skimmer and solar panels.

In operation, and with reference first to FIGS. 2, 6 and 7, the skimmer is located in the cylindrical opening 60 in deck 62 in which basket 64 is accommodated. Water from the swimming pool discharges through channel 66 and flows downwardly through the perforated basket to conduit 68. From there the water flows to a circulating pump (not illustrated).

The side walls 12, 14 of the skimmer are in contact with the side walls 70$a$ of the opening 70 to channel 66 so that all floating debris which discharges through the opening is carried upward by the belt and when it reaches the top of the belt discharges from it. Brush 30 is positioned to contact the belt on its ascending path and the brush serves to remove any debris which adheres to the belt and remains attached to it after the belt begins its descent.

Containers (not illustrated) are positioned to collect the debris which falls from the top of the conveyor and debris which is removed by the brush.

With reference to FIGS. 1 and 7, L-shaped masts 80$a,b$ extend upwardly from opposite sides of the skimmer. At the top of the vertical component of each mast is a ball and socket joint 82. Fixed to the socket is a U-shaped fastener 84 which connects the joint with the frame 86 of a conventional solar panel 88.

The ball and socket joint acts as a swivel and as a result the socket is capable of rotating 360 degrees. The solar panel and its frame are similarly capable of rotating 380 degrees as illustrated by arrows 90 in FIG. 7. In that drawing as well as in FIG. 8, the socket swivels about a vertical axis 92$a$-92 which coincides with the longitudinal axis of the vertical component of mast 80. The solar panel similarly swivels about the same axis.

Figure 8A:
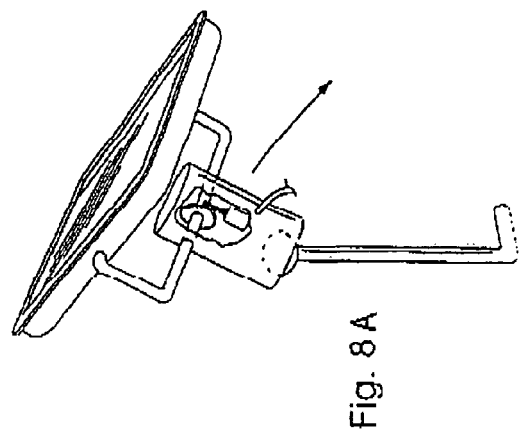
FIG. 8A is another perspective view of a solar panel in a tilted position.

The socket, being mounted to a hall, is capable of tilting as illustrated in FIG. 8A. As the socket tilts so too does the solar panel. By means of the tilting capability of the socket, the solar panel can be aimed at the sun whether the sun is relatively low in the horizon or directly above the panel.

Figure 8:
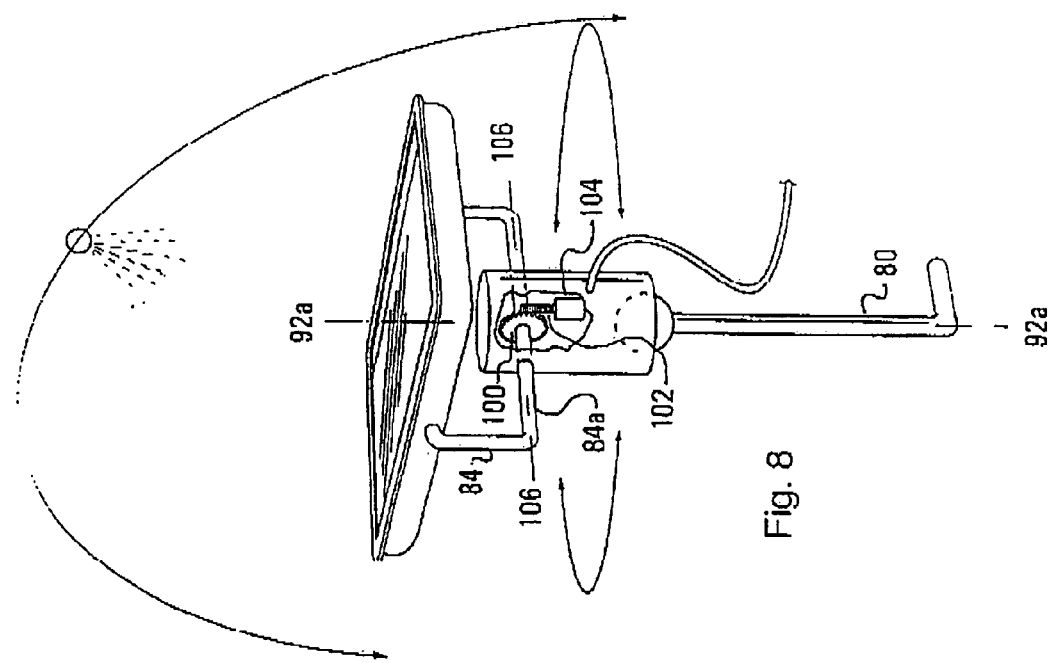
FIG. 8 is a perspective view of a solar panel and the mechanism by which its position is altered.

With further reference to FIG. 8, the web 84$a$ of fastener 84 extends through the socket and is pivotal relative to it. A gear wheel 100 is fastened to the web and mates with a worm gear 102. The latter gear is activated by an electric motor 104. As the motor rotates, the solar panel pivots about an axis 106-106 from a position in which it faces to the right to a position in which it faces to the left in the manner illustrated in FIGS. 9 and 10.

By means of the ball and socket joint as well as fastener 84, the solar panels can be positioned so that they face the sun for maximum effectiveness of the panels no matter what the season of the year in which they are operating and no matter what the position of the pool is in relation to the sun. The solar panels are positioned as follows: first, the panels are rotated or swivelled until the axis 106-106 of fastener 84 extends from east to west. The swivelling means i.e. the ball and socket joint, permits the panels to be moved in this manner. The socket is then tilted as illustrated in FIG. 8A to adjust the position of the solar panels such that they face the sun. Such tilting should preferably be carried out at noon when the sun is mid-way along its path across the sky. By means of the tilting capability of a ball and socket joint, the panels can be positioned to face the sun when the sun is relatively low in the sky such as in spring and fall and when it is at it highest such as in the summer.

Figure 9:
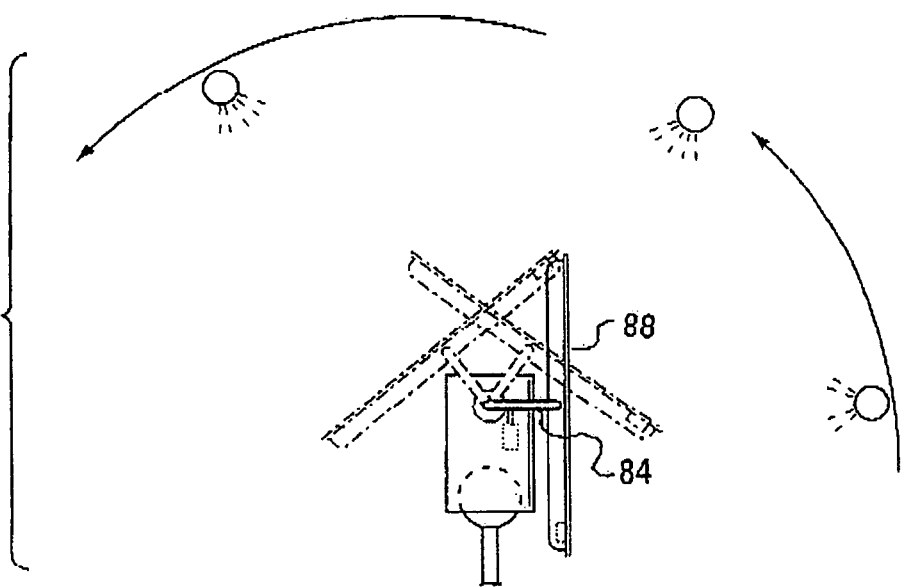
FIGS. 9 and 10 illustrates various positions of the solar panels.
Figure 10:
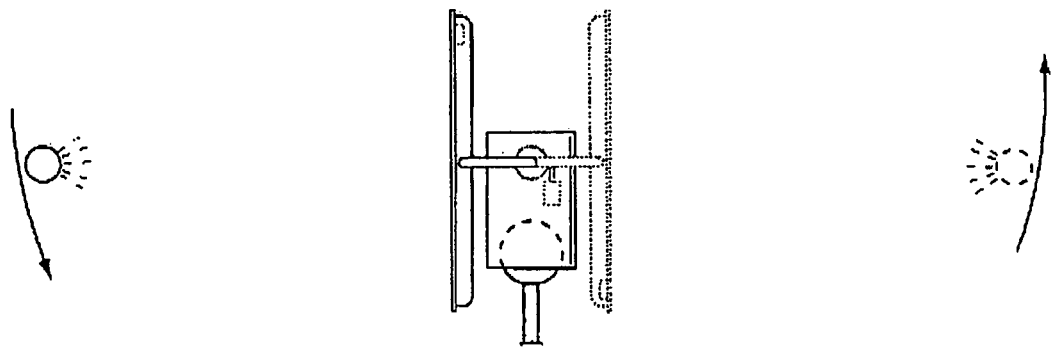

Finally, the speed of electric motor 104 is set such that it causes the solar panels to pivot from the starting position illustrated in FIG. 10 in which it faces the east to the final position illustrated in FIG. 9 in which it faces to the west in the time which elapses from day break to sunset. A timer (not illustrated) is provided to cause the electric motor to reverse direction.

With referenced to FIGS. 1 and 3, the solar panels are in circuit with a battery (not illustrated) and function to charge the battery by the electrical power which the solar panel generates. Electric motors 29 and 104 are in circuit with the battery and are activated by it. The motor activates drive gear 24 and a switch 110 turns the circuit on and off. The motors can be activated by solar energy as mentioned above or they can be activated by a battery alone or by electrical energy from a conventional power source It will be understood of course that modifications can be made in the structure of the skimmer and solar panels without departing from the scope and purview of the invention as defined in the appended claims.

We claim:

1. A solar powered skimmer for a swimming pool including: a solar panel pivotal about an axis; a flexible endless belt having lower and upper portions which terminate at lower and upper ends, respectively, of said belt; motive means for causing said belt to travel in ascending and descending paths and being activated at least in part by said solar panel, a lower portion of said belt being adapted to be immersed in the water in said swimming pool for skimming debris floating on the surface of said water, swivelling means arranged to permit adjustment of the orientation of said axis such that said axis extends from east to west; tilting means for adjusting the position of said solar panel such that said solar panel faces the sun; and means for causing said solar panel to pivot about said axis at a rate which equals the observed rate of movement of the sun as it crosses the sky from morning to evening such that said solar panel continuously faces the sun during daylight.

2. The solar powered skimmer of claim 1, wherein said swivelling means and said tilting means are a ball and socket joint.

3. The solar powered skimmer of claim 1 wherein said axis is horizontal.

4. The solar powered skimmer of claim 1 wherein said pivoting means causes said solar panel to pivot about an angle of approximately 180 degrees.

5. The solar powered skimmer of claim 2 wherein said ball and socket joint causes said solar panel to swivel about an angle of approximately 180 degrees.

6. The solar powered skimmer of claim 1 wherein said belt, when travelling in said ascending path running upwardly from said lower end and around said upper end, said belt when travelling in said descending path running downward and around said lower end, said belt when travelling in said ascending path carrying said debris upward and discharging said debris out of said water.

7. The skimmer of claim 6 wherein said belt has perforations through which water may pass.

8. The skimmer of claim 6 further including a brush mounted to remove any debris which adheres to said belt.

9. The skimmer of claim 8 wherein said brush is mounted to rotate and having a plurality of bristles which contact said belt.

10. The skimmer of claim 8 wherein said brush is mounted to rotate about an axis normal to the direction in which said belt travels.

11. The skimmer of claim 8 wherein said brush is mounted to contact said belt in said descending path.

12. The skimmer of claim 11 wherein said brush is mounted to rotate and having a plurality of bristles which contact said belt.

13. The skimmer of claim 11 wherein said brush is mounted to rotate about an axis normal to the direction in which said belt travels.

\* \* \* \* \*